(12) United States Patent
Childress et al.

(10) Patent No.: US 9,277,020 B2
(45) Date of Patent: Mar. 1, 2016

(54) REAL LIFE TO DIGITAL LIFE EVENT CORRELATION

(71) Applicant: International Business Machines Corporation, Armonk, NY (US)

(72) Inventors: Rhonda L. Childress, Austin, TX (US); Manvendra Gupta, Brampton (CA); Stewart Hyman, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/962,082

(22) Filed: Aug. 8, 2013

(65) Prior Publication Data

US 2015/0046543 A1    Feb. 12, 2015

(51) Int. Cl.
*G06F 15/16* (2006.01)
*H04L 29/08* (2006.01)

(52) U.S. Cl.
CPC ............ *H04L 67/22* (2013.01); *H04L 67/26* (2013.01); *H04L 67/306* (2013.01)

(58) Field of Classification Search
CPC ........ H04L 67/22; H04L 67/26; H04L 67/306
See application file for complete search history.

(56) References Cited

U.S. PATENT DOCUMENTS

| | | | | |
|---|---|---|---|---|
| 2011/0087705 A1* | 4/2011 | Swink | ..................... | H04L 51/32 707/800 |
| 2011/0184780 A1* | 7/2011 | Alderson | ............... | G06Q 30/02 705/7.32 |
| 2011/0238755 A1* | 9/2011 | Khan | ..................... | G06Q 50/01 709/204 |
| 2012/0016803 A1 | 1/2012 | Tharp | | |
| 2012/0047055 A1 | 2/2012 | Aiello | | |
| 2014/0032688 A1* | 1/2014 | Anthony | ............... | H04L 67/306 709/206 |
| 2014/0188994 A1* | 7/2014 | Patterson | ................ | H04L 67/22 709/204 |
| 2014/0189010 A1* | 7/2014 | Brown | .................. | H04L 65/403 709/204 |
| 2014/0237053 A1* | 8/2014 | Abhyanker | ........ | G06Q 30/0261 709/204 |
| 2015/0052209 A1* | 2/2015 | Vorotyntsev | ............ | H04L 51/32 709/206 |

OTHER PUBLICATIONS

Good, Jonathan; The rise of the dead: How many ghosts are on Facebook?; 1000 Memories; http://blog.1000memories.com/22-the-rise-of-the-dead-how-many-ghosts-are-on-facebook; Nov. 18, 2010; 4 pages.

* cited by examiner

*Primary Examiner* — Ario Etienne
*Assistant Examiner* — Blake Rubin
(74) *Attorney, Agent, or Firm* — Schmeiser, Olsen & Watts; John Pivnichny

(57) ABSTRACT

A method and system for correlating events with social media is provided. The method includes retrieving from a social network, social network data associated with users of the social network. The social network data is associated with event data associated with a user of the users. Temporary actions associated with a social network account of the user are enabled and a notification is transmitted to a group of users. In response, confirmation data associated with enabling the temporary actions is received from the group of users and permanent actions associated with the temporary actions are enabled.

16 Claims, 6 Drawing Sheets

REAL LIFE TO DIGITAL LIFE EVENT CORRELATION

FIELD

The present invention relates generally to a method for correlating real life events with a digital life, and in particular to a method and associated system for associating real life events with social media outlets.

BACKGROUND

Associating events with users typically includes an inaccurate process with little flexibility. Evaluating the associated events may include a complicated process that may be time consuming and require a large amount of resources. Accordingly, there exists a need in the art to overcome at least some of the deficiencies and limitations described herein above.

SUMMARY

A first aspect of the invention provides a method comprising: retrieving, by a computer processor of a computing system from at least one social network, social network data associated with users of the at least one social network; analyzing, by the computer processor, the social network data; associating, by the computer processor, results of the analyzing the social network data with event data associated with a user of the users; enabling, by the computer processor based on the results of the analyzing, temporary actions associated with a social network account of the user, wherein the social network account of the user is associated with the at least one social network; transmitting, by the computer processor to a group of users of the users, a notification indicating the temporary actions and associated reasons for the temporary actions, the group of users associated with the user; receiving, by the computer processor from the group of users in response to the notification, confirmation data associated with the enabling the temporary actions and the associated reasons for the temporary actions; and enabling, by the computer processor based on the confirmation data, permanent actions associated with the temporary actions.

A second aspect of the invention provides a computing system comprising a computer processor coupled to a computer-readable memory unit, the memory unit comprising instructions that when executed by the computer processor implements a method comprising: retrieving, by the computer processor from at least one social network, social network data associated with users of the at least one social network; analyzing, by the computer processor, the social network data; associating, by the computer processor, results of the analyzing the social network data with event data associated with a user of the users; enabling, by the computer processor based on the results of the analyzing, temporary actions associated with a social network account of the user, wherein the social network account of the user is associated with the at least one social network; transmitting, by the computer processor to a group of users of the users, a notification indicating the temporary actions and associated reasons for the temporary actions, the group of users associated with the user; receiving, by the computer processor from the group of users in response to the notification, confirmation data associated with the enabling the temporary actions and the associated reasons for the temporary actions; and enabling, by the computer processor based on the confirmation data, permanent actions associated with the temporary actions.

A third aspect of the invention provides a computer program product, comprising a computer readable hardware storage device storing a computer readable program code, the computer readable program code comprising an algorithm that when executed by a computer processor of a computer system implements a method, the method comprising: retrieving, by the computer processor from at least one social network, social network data associated with users of the at least one social network; analyzing, by the computer processor, the social network data; associating, by the computer processor, results of the analyzing the social network data with event data associated with a user of the users; enabling, by the computer processor based on the results of the analyzing, temporary actions associated with a social network account of the user, wherein the social network account of the user is associated with the at least one social network; transmitting, by the computer processor to a group of users of the users, a notification indicating the temporary actions and associated reasons for the temporary actions, the group of users associated with the user; receiving, by the computer processor from the group of users in response to the notification, confirmation data associated with the enabling the temporary actions and the associated reasons for the temporary actions; and enabling, by the computer processor based on the confirmation data, permanent actions associated with the temporary actions.

The present invention advantageously provides a simple method and associated system capable of associating events with users.

DETAILED DESCRIPTION

Figure 1:
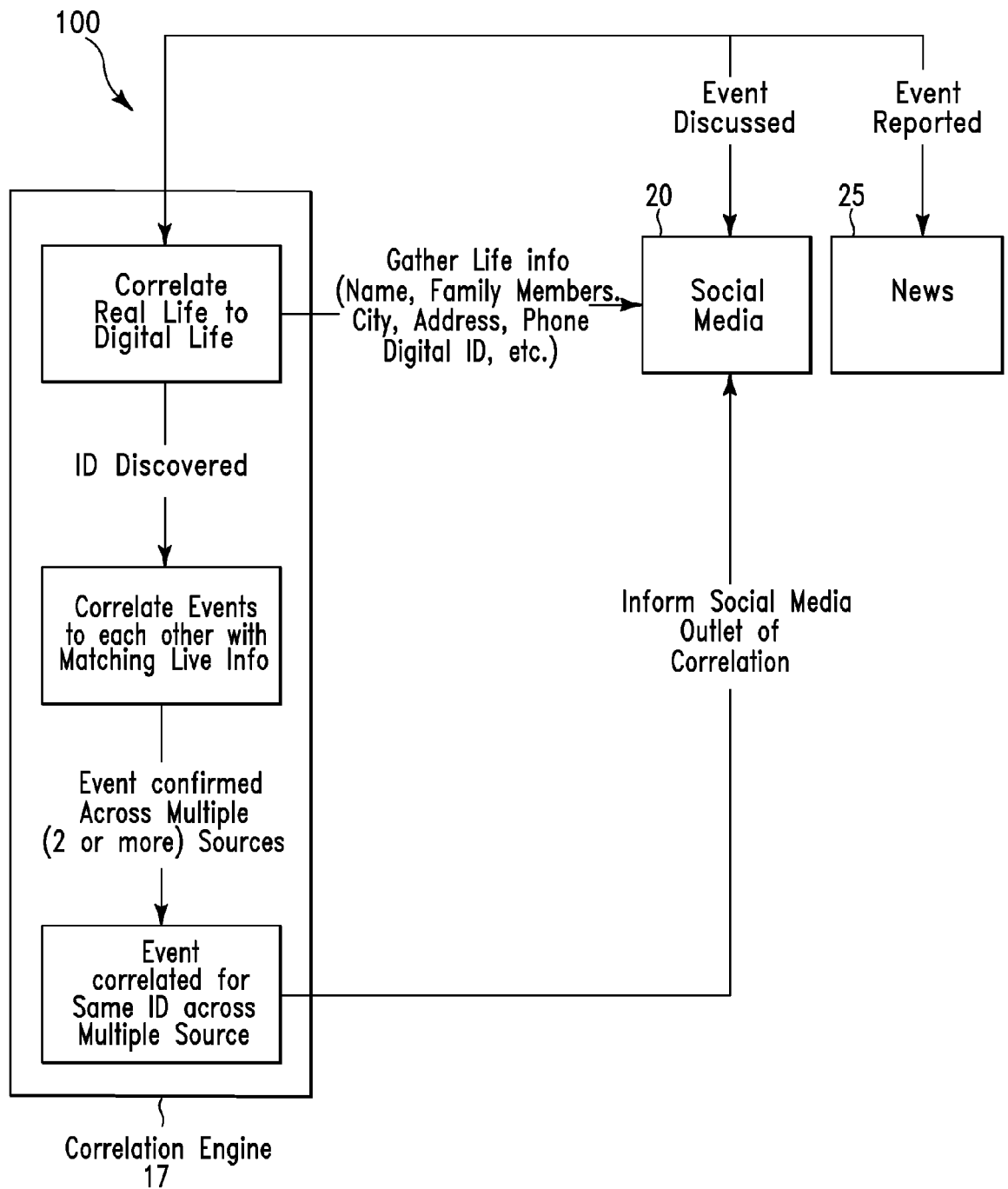
FIG. 1 illustrates a system for providing a means for correlating real life events with a digital life associated with social media outlets, in accordance with embodiments of the present invention.

FIG. 1 illustrates a system 100 for providing a means for correlating real life events with a digital life associated with social media outlets, in accordance with embodiments of the present invention. Social networking media outlets or websites may be used to convey real-life events such as, inter alia, births, deaths, etc. System 100 provides a mechanism for:

1. Automatically correlating real life events from sources such as, inter alia, obituaries newspapers, online services, law enforcement agencies, etc.
2. Deduce online personas for name(s) retrieved from the sources based on geographical and profile information.
3. Qualify and refine the online personas based on text mining posts in social networking groups/circles.
4. Deducing life events (based on information derived in steps 1-3) and enabling an appropriate action to freeze or suspend an account transmitting a notification of a person and/or family for confirmation.
5. Marking an online persona/account as inactive and eliminating the account from repetitive reminders to reconnect.

System 2 of FIG. 1 includes a correlation engine 17 (i.e., within a computing system) connected through a network to a social media feed/system 20 and a news feed/system 25. The network 7 may include any type of network including, inter alia, a local area network, (LAN), a wide area network (WAN), the Internet, a wireless network, etc. The computing system may include any type of computing system(s) including, inter alia, a computer (PC), a laptop computer, a tablet computer, a server, a PDA, a smart phone, etc.

Correlation engine 17 enables the following process with respect to determining a death has occurred:

When events are presented in news articles, obituaries, or social media posts (e.g., presented via social media feed/system 20 and news feed/system 25), correlation engine 17 determines the events to be events (associated with a death) by the use of key words in specified grammatical presentations (e.g., died, deceased, etc.). If correlation engine 17 determines that there is a potential death of an individual who is named in one or more of posts of a social networking system, correlation engine 17 will attempt to determine a real identity and a digital identity of the individual by comparing known information between multiple posts and systems (e.g., a name, city, age, survived by, friends, workplace, email address, last known login, etc.). If the digital identity an individual (e.g., John Doe) with respect to multiple events correlate then correlation engine 17 may accurately determine that the real person (John Doe) with a digital ID of JohnDoe@email.address.com has actually passed away. For example:
1. John Doe is named in an obituary stating that he is survived his wife Jane Doe and 2 named children).
2. A social network ID with the name John Doe is discovered. The social network ID John Doe is listed as being married to Jane Doe, has posted pictures with matching names of the 2 named children, and has multiple friends of John Doe posting RIP messages about John Doe.

Additionally, a certainty percentage may be calculated based on a number of correlating posts and the detail of information describing the situation. In response, correlation engine 17 may determine which social media systems that the social network ID correlates to and may inform the social media system that the individual has passed away. The various social media systems may then take any appropriate actions, including a temporary suspension of a social networking account followed by disabling of the account once family members are contacted to confirm the death and requested action.

The following steps describe an implementation example enabling a means for correlating real life events with a digital life associated with social media outlets, in accordance with embodiments of the present invention.
1. An (real life) event (associated with an individual) occurs (e.g., a birth or death).
2. Users (of social media) post information regarding the event on social media networks.
3. The social media networks perform text analytics to determine that the event has occurred. For example, as more people post (on the social media networks), entity analytics may be used to determine people involved with the posts and relationships to the event/involved individual.
4. The social media networks co-relate data (associated with the event) from trusted sources. Trusted sources may include:
   A. Media outlets associated with a real name requirement.
   B. A source comprising attributes associated with the individual and associated social network. The attributes are utilized to identify the individual. For example, attributes such as location (based on location data of a device used to make an update, an EXIF data in an uploaded image(s), etc.
   B. A source generating entity analytics used to continuously monitor different name(s) used by individuals within the social network. Once a location is determined and a name(s) of the individual is identified, an event feed from the trusted sources of locale is scanned to corroborate the event.
5. A catalogue of additional trusted sources (e.g., newspaper records, data from law enforcement agencies, life incident data, etc.) is built over time.
6. All data from trusted sources is used to build a profile of the individual including attributes such as location, name, location of the incident, etc.
7. Text analytics associated with comments/data posted on social media networks are used with entity analytics performed over time and correlated with data from the public sources to uniquely identify an individual(s) that may have passed away.
8. The social media networks enter a process to obtain confirmation from people that are closest to the individual. For example, top N (closest or most interacted with) connections are asked to confirm. Upon confirmation, the social media account of the individual is disabled thereby excluding the social media account from all updates, reminders, etc.
9. Well established social media outlets may optionally process every single account in their database and correlate it with data from the trusted sources to determine people who may no longer be alive.
10. In cases of new births, people generally post pictures or other status updates that may be picked up by text analytics. In response, a separate process flow is enabled to validate (i.e., for individuals that have been tagged or deduced via analytics) for confirmation. A social media outlet may optionally initiate a new process to label a new birth (e.g., as a new timeline or account cataloguing the activities of the new born).

Figure 2:
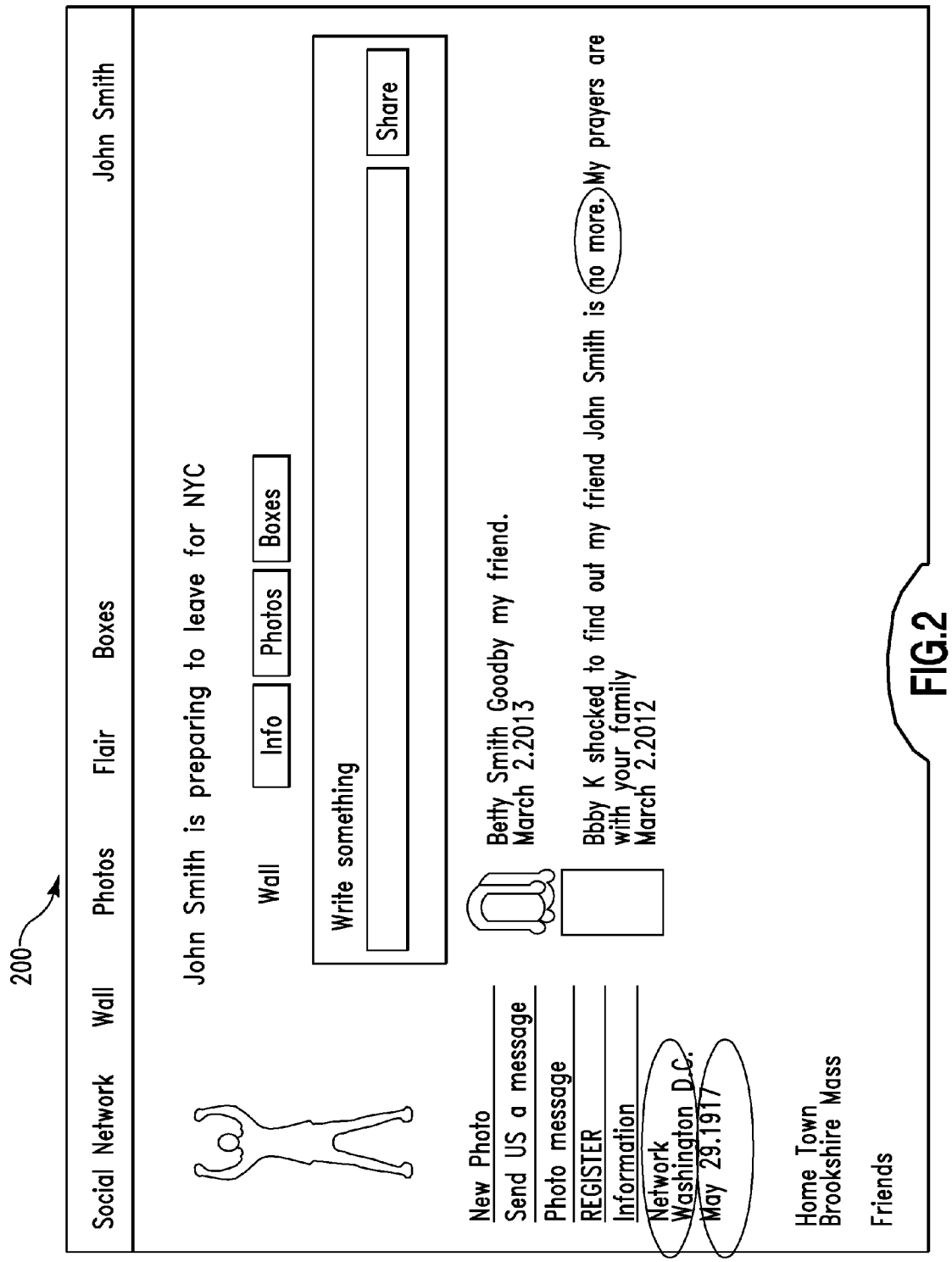
FIG. 2 illustrates a screen shot describing an implementation example for correlating real life events with a digital life associated with social media outlets, in accordance with embodiments of the present invention.

FIG. 2 illustrates a screen shot 200 describing an implementation example for correlating real life events with a digital life associated with social media outlets, in accordance with embodiments of the present invention. The implementation example illustrates that Betty Smith and Bobby K (i.e., connections of John Smith who is deceased) have posted (on a social network) about his passing. A text analytics (or text mining) process is performed with respect to data that extracts tags such as "Goodbye" and "is no more" to determine that (according to people within John Smith's network) that he has passed. Additional information gathered by the social media network (such as, inter alia, a location and date of birth) comprises related informational data regarding John Smith. Additionally, the social media network may federate the informational data with public data sources (to verify a name, date of birth, and location) and law enforcement lists or obituaries issued by local newspapers. If the data sources confirm that John Smith has passed away, then correlation engine 17 transmits a message to social media contacts of John Smith. The message may link to a web page where:
1. The contacts are asked to confirm that John Smith has passed away.
2. The contacts are provided an option to choose if John Smith's social network Webpage will remain enabled. For example, the contacts may select disabling all updates to John Smith's social network Webpage. Alternatively, the contacts may select an option for continuing to allow people to post messages (to John Smith's social network Webpage) for a specified time period.

Figure 3:
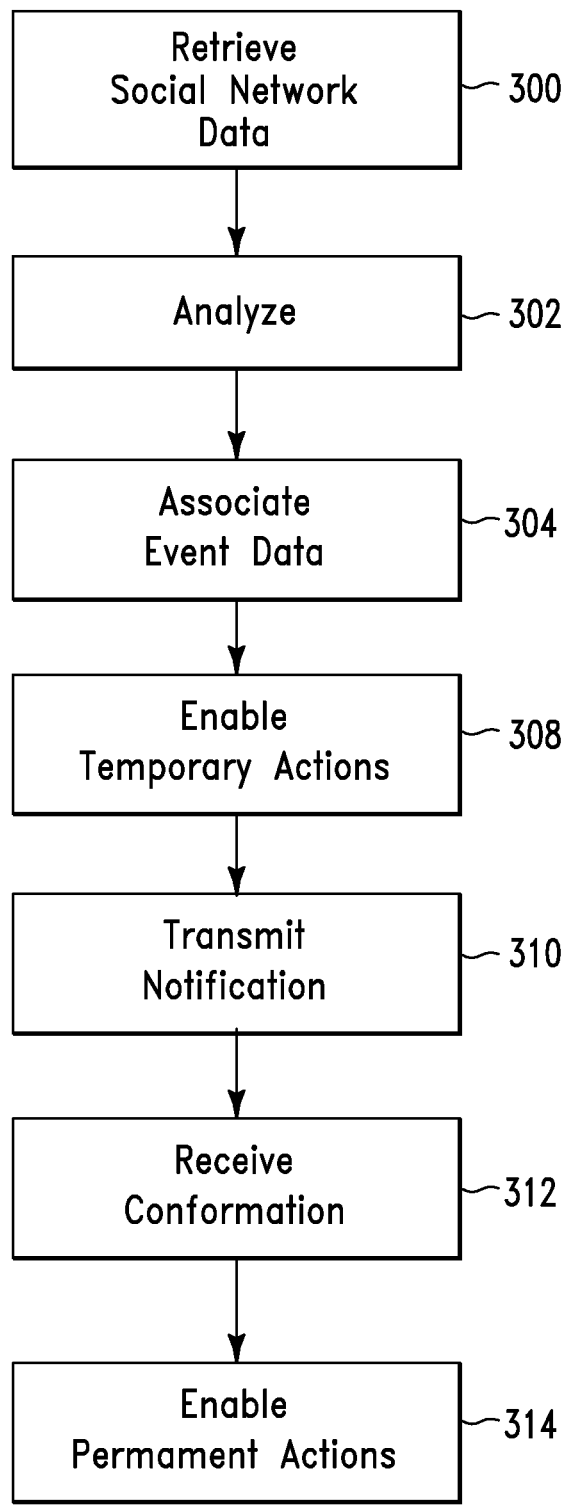
FIG. 3 illustrates an algorithm detailing a process flow enabled by the system of FIG. 1 for providing a means for correlating real life events with a digital life associated with social media outlets, in accordance with embodiments of the present invention.

FIG. 3 illustrates an algorithm detailing a process flow enabled by system 100 of FIG. 1 for providing a means for correlating real life events with a digital life associated with social media outlets, in accordance with embodiments of the present invention. In step 300, social network data associated with users of at least one social network (e.g., social network Website) is retrieved. In step 302, the social network data is analyzed. In step 304, results of the analysis of step 302 are associated with event data associated with a user of the users. The event data may be generated by performing a text analytics process with respect to the social network data. Alternatively or additionally, the event data may be generated performing a video analytics process with respect to the social network data. In step 308, temporary actions associated with a social network account of user are enabled. The temporary actions may include temporarily suspending or disabling the social network account of the user. In step 310, a notification indicating the temporary actions and associated reasons for enabling the temporary actions are transmitted to a group of users associated with the social network account of the user. In step 312, confirmation data associated with enabling the temporary actions is received from the group of users in response to the notification of step 310. In step 314, permanent actions associated with the temporary actions are enabled based on the confirmation data. Enabling the permanent actions may include (if the analyzing and confirmation data indicate that the user is no longer available (e.g., has passed away) for access to the social network account):
1. Disabling the social network account and disabling updates/posts associated with the social network account.
2. Maintaining the social network account and disabling updates/posts associated with the social network account.
3. Maintaining the social network account and enabling (for a specified time period) updates/posts associated with the social network account.

Figure 4:
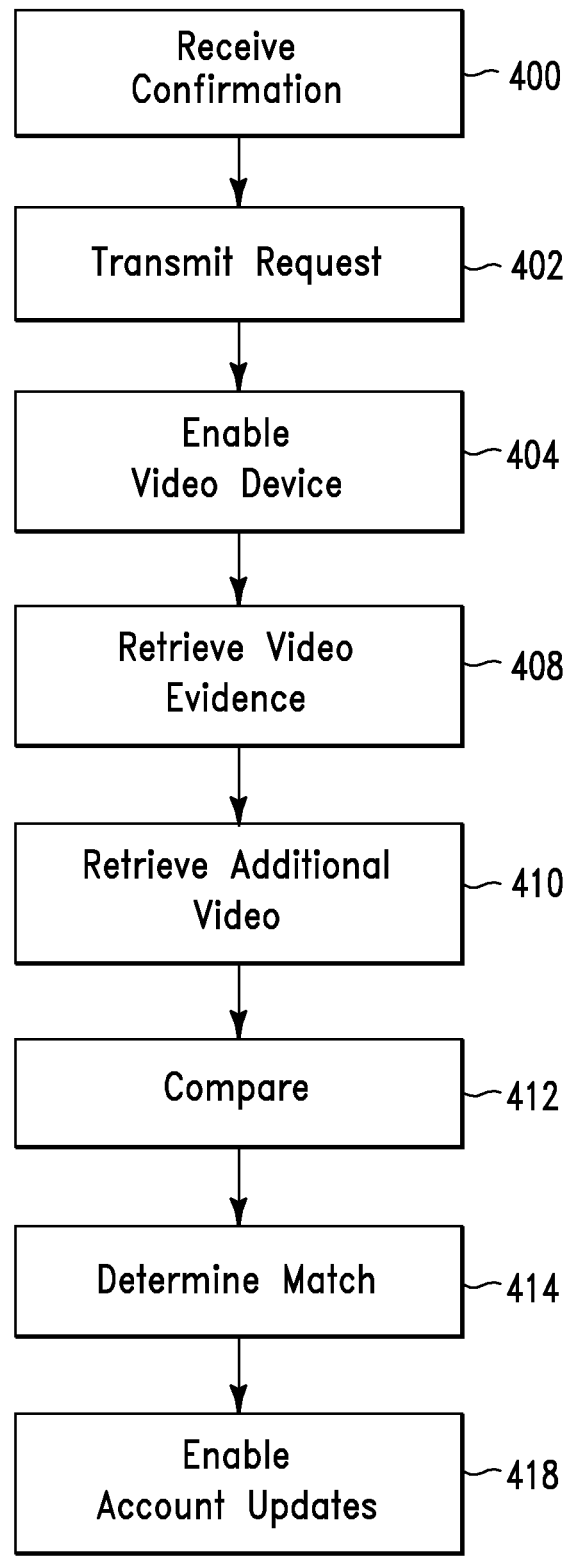
FIG. 4 illustrates an algorithm detailing a process flow enabled by the system of FIG. 1 for reinstating a permanently disabled social networking account of a user due to a mistake, in accordance with embodiments of the present invention.

FIG. 4 illustrates an algorithm detailing a process flow enabled by system 100 of FIG. 1 for reinstating a permanently disabled social networking account of a user due to a mistake, in accordance with embodiments of the present invention. In step 400, an email confirmation is received (from the user) indicating that the user is available (e.g., has not passed away) for access to the social network account. The email confirmation is received from a registered email address associated with the social network account. In step 402, a request for video evidence indicating that the user is available for access to the social network account is transmitted to the user. In step 404, a video device (e.g., a Web camera of a device belonging to the user) is enabled in response to a user action with respect to the request. In step 408, a current photo of the user is retrieved from the video device. In step 410, additional photos of the user are retrieved from the social network account. In step 412, the current photo is compared to the additional photos. In step 414, a match between the current photo and the additional photos is determined. In step 418, the social network account and associated updates are enabled.

Figure 5:
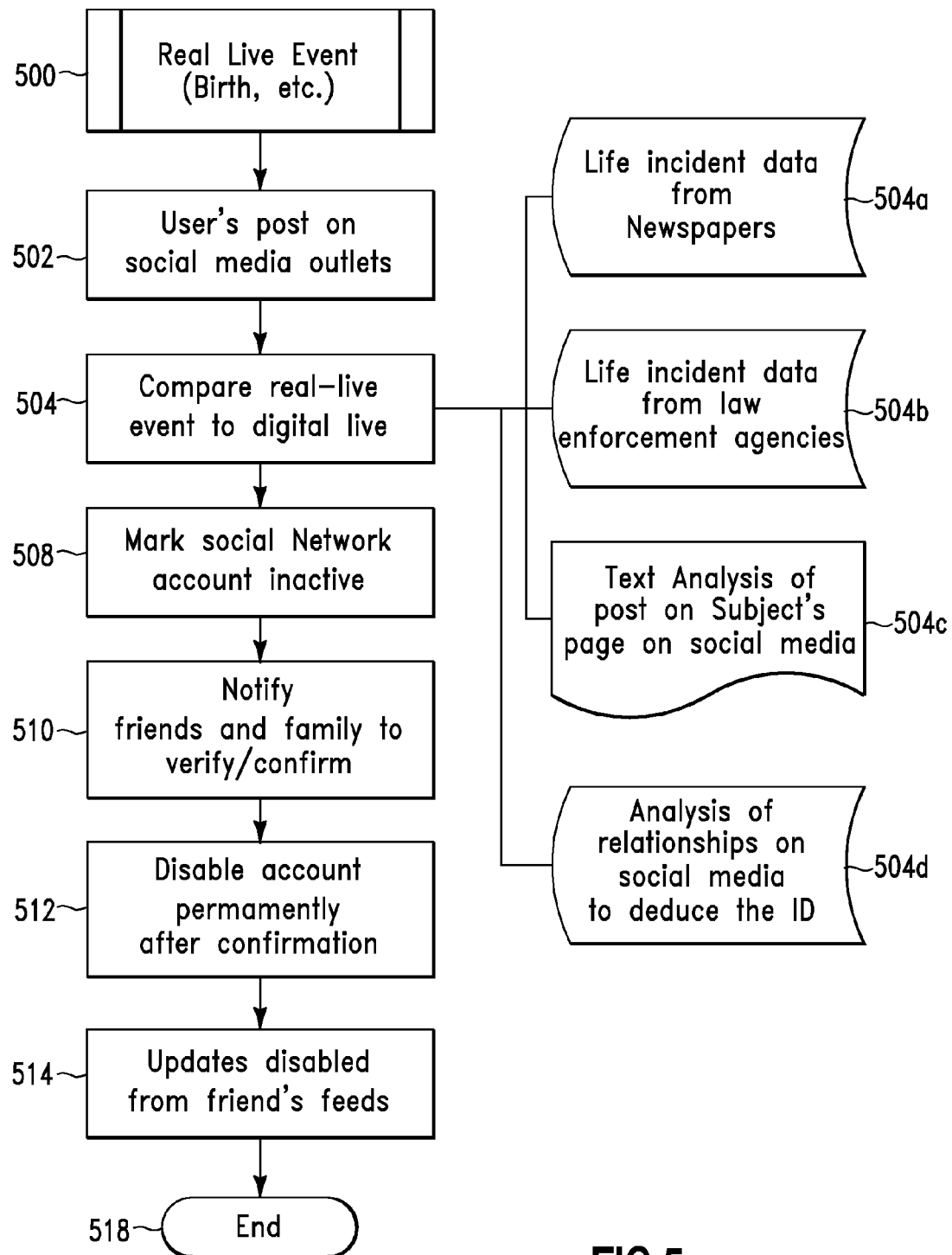
FIG. 5 illustrates an algorithm detailing a process flow describing an implementation example enabled by the system of FIG. 1 for providing a means for correlating real life events with a digital life associated with social media outlets, in accordance with embodiments of the present invention.

FIG. 5 illustrates an algorithm detailing a process flow describing an implementation example enabled by system 100 of FIG. 1 for providing a means for correlating real life events with a digital life associated with social media outlets, in accordance with embodiments of the present invention. Each of the steps in the algorithm of FIG. 2 may be enabled and executed in any order by a computer processor executing computer code. In step 500, an (real life) event (associated with an individual) occurs (e.g., a birth, a death, etc.). In step 502, users post information regarding the event on social media networks. In step 504, the event is compared to digital events retrieved from a variety of sources. For example:
1. Digital events may comprise life incident data 504a retrieved from newspapers.
2. Digital events may comprise life incident data 504b retrieved from law enforcement agencies.
3. Digital events may comprise text analysis data 504c generated by the social media networks performing text/video analytics to determine that the event has occurred.
4. Digital events may comprise relationship analysis data 504d generated by the social media networks analyzing social media relationships to determine that the event has occurred. For example, as more people post (on the social media networks), entity analytics may be used to determine people involved with the posts and relationships to the event/involved individual.

In step 508, a social network account of the individual is temporally marked as inactive due to the event. In step 510, friends and family (of the individual) are notified that the social network account of the individual is temporally marked as inactive. The friends and family are asked to confirm/verify the event. In step 512, the network account of the individual is permanently disabled in response to confirmation of the event. In step 514, updates (from friends) are disabled from the network account of the individual and the process is terminated in step 518.

Figure 6:
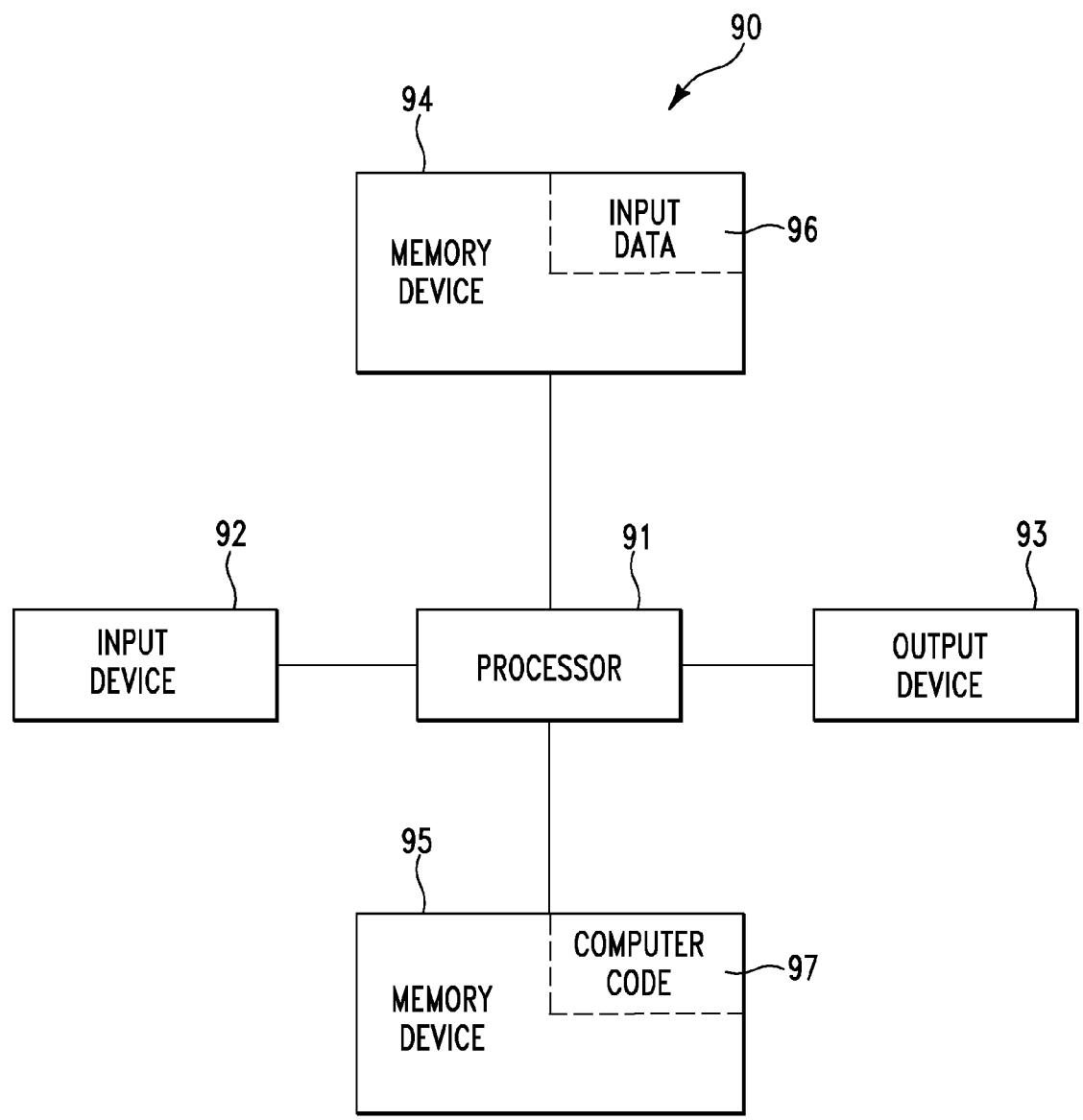
FIG. 6 illustrates a computer apparatus used by the system of FIG. 1 providing a means for correlating real life events with a digital life associated with social media outlets, in accordance with embodiments of the present invention.

FIG. 6 illustrates a computer apparatus 90 used by system 100 of FIG. 1 for providing a means for correlating real life events with a digital life associated with social media outlets, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-5) for providing a means for correlating real life events with a digital life associated with social media outlets. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithms of FIGS. 3-5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to provide a means for correlating real life events with a digital life associated with social media outlets. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for providing a means for correlating real life events with a digital life associated with social media outlets. In another embodiment, the invention provides a business method that performs the process steps of the invention on a subscription, advertising, and/or fee basis. That is, a service supplier, such as a Solution Integrator, could offer to provide a means for correlating real life events with a digital life associated with social media outlets. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
retrieving, by a computer processor of a computing system from at least one social network, social network data associated with users of said at least one social network;
analyzing, by said computer processor, said social network data;
associating, by said computer processor, results of said analyzing said social network data with event data associated with a user of said users;
enabling, by said computer processor based on said results of said analyzing, temporary actions associated with a social network account of said user, wherein said social network account of said user is associated with said at least one social network;
transmitting, by said computer processor to a group of users of said users, a notification indicating said temporary actions and associated reasons for said temporary actions, said group of users associated with said user;
receiving, by said computer processor from said group of users in response to said notification, confirmation data associated with said enabling said temporary actions and said associated reasons for said temporary actions;
enabling, by said computer processor based on said confirmation data, permanent actions associated with said temporary actions, wherein said results of said analyzing and said confirmation data indicate that said user is no longer available for access to said social network account, wherein said enabling said permanent actions comprises:
disabling said social network account of said user; and
disabling updates associated with said social network account of said user to/from said group of users;
receiving, by said computer processor from said user, an email confirmation indicating that said user is available for access to said social network account, wherein said email confirmation is associated with a registered email address associated with said social network account;
transmitting, by said computer processor to said user, a request for video evidence indicating that said user is available for access to said social network account;
enabling, by said computer processor in response to a user action with respect to said request, a Web camera of a device belonging to said user;
retrieving, by said computer processor from said Web camera a current photo of said user;
retrieving, by said computer processor from said social network account additional photos of said user;
comparing, by said computer processor, said current photo to said additional photos of said user;
determining, by said computer processor in response to results of said comparing, a match between said current photo and a photo of said additional photos;
enabling said social network account of said user; and
enabling said updates associated with said social network account of said user with respect to said group of users.

2. The method of claim 1, wherein said results of said analyzing and said confirmation data indicate that said user is no longer available for access to said social network account, wherein said enabling said permanent actions comprises:
maintaining said social network account of said user; and
disabling updates/posts associated with said social network account of said user.

3. The method of claim 1, wherein said results of analyzing and said confirmation date indicate that said user is no longer available for access to said social network account, wherein said enabling said permanent actions comprises:
maintaining said social network account of said user; and
enabling, for a specified time period, updates/posts associated with said social network account of said user.

4. The method of claim 1, further comprising:
retrieving, by said computer processor from media outlets, said event data.

5. The method of claim 1, further comprising:
retrieving, by said computer processor from law enforcement agencies, said event data.

6. The method of claim 1, further comprising:
performing, by said computer processor, a text analytics process with respect to said social network data; and
generating, by said computer processor based on results of said performing said text analytics process, said event data.

7. The method of claim 1, further comprising:
performing, by said computer processor, a video analytics process with respect to said social network data; and
generating, by said computer processor based on results of said performing said video analytics process, said event data.

8. The method of claim 1, further comprising:
analyzing, by said computer processor, relationships of said users with respect to said social network data; and
generating, by said computer processor based on results of said analyzing said relationships of said users, said event data.

9. The method of claim 1, further comprising:
providing at least one support service for at least one of creating, integrating, hosting, maintaining, and deploying computer-readable code in the computing system, said code being executed by the computer processor to implement: said retrieving, said analyzing, said associating, said enabling said temporary actions, said transmitting, said receiving, and said enabling said permanent actions.

10. A computing system comprising a computer processor coupled to a computer-readable memory unit, said memory unit comprising instructions that when executed by the computer processor implements a method comprising:
retrieving, by said computer processor from at least one social network, social network data associated with users of said at least one social network;
analyzing, by said computer processor, said social network data;
associating, by said computer processor, results of said analyzing said social network data with event data associated with a user of said users;
enabling, by said computer processor based on said results of said analyzing, temporary actions associated with a social network account of said user, wherein said social network account of said user is associated with said at least one social network;
transmitting, by said computer processor to a group of users of said users, a notification indicating said temporary actions and associated reasons for said temporary actions, said group of users associated with said user;
receiving, by said computer processor from said group of users in response to said notification, confirmation data associated with said enabling said temporary actions and said associated reasons for said temporary actions;
enabling, by said computer processor based on said confirmation data, permanent actions associated with said temporary actions, wherein said results of said analyzing and said confirmation data indicate that said user is no longer available for access to said social network account, wherein said enabling said permanent actions comprises:
  disabling said social network account of said user; and
  disabling updates associated with said social network account of said user to/from said group of users;
receiving, by said computer processor from said user, an email confirmation indicating that said user is available for access to said social network account, wherein said email confirmation is associated with a registered email address associated with said social network account;
transmitting, by said computer processor to said user, a request for video evidence indicating that said user is available for access to said social network account;
enabling, by said computer processor in response to a user action with respect to said request, a Web camera of a device belonging to said user;
retrieving, by said computer processor from said Web camera a current photo of said user;
retrieving, by said computer processor from said social network account additional photos of said user;
comparing, by said computer processor, said current photo to said additional photos of said user;
determining, by said computer processor in response to results of said comparing, a match between said current photo and a photo of said additional photos;
enabling said social network account of said user; and
enabling said updates associated with said social network account of said user with respect to said group of users.

11. The computing system of claim 10, wherein said results of said analyzing and said confirmation data indicate that said user is no longer available for access to said social network account, wherein said enabling said permanent actions comprises:
maintaining said social network account of said user; and
disabling updates/posts associated with said social network account of said user.

12. The computing system of claim 10, wherein said results of said analyzing and said confirmation data indicate that said user is no longer available for access to said social network account, wherein said enabling said permanent actions comprises:
maintaining said social network account of said user; and
enabling, for a specified time period, updates/posts associated with said social network account of said user.

13. The computing system of claim 10, wherein said method further comprises:
retrieving, by said computer processor from media outlets, said event data.

14. The computing system of claim 10, wherein said method further comprises:
retrieving, by said computer processor from law enforcement agencies, said event data.

15. The computing system of claim 10, wherein said method further comprises:
performing, by said computer processor, a text analytics process with respect to said social network data; and
generating, by said computer processor based on results of said performing said text analytics process, said event data.

16. A computer program product, comprising a computer readable hardware storage device storing a computer readable program code, said computer readable program code comprising an algorithm that when executed by a computer processor of a computer system implements a method, said method comprising:
retrieving, by said computer processor from at least one social network, social network data associated with users of said at least one social network;
analyzing, by said computer processor, said social network data;
associating, by said computer processor, results of said analyzing said social network data with event data associated with a user of said users;
enabling, by said computer processor based on said results of said analyzing, temporary actions associated with a social network account of said user, wherein said social network account of said user is associated with said at least one social network;
transmitting, by said computer processor to a group of users of said users, a notification indicating said temporary actions and associated reasons for said temporary actions, said group of users associated with said user;
receiving, by said computer processor from said group of users in response to said notification, confirmation data associated with said enabling said temporary actions and said associated reasons for said temporary actions;
enabling, by said computer processor based on said confirmation data, permanent actions associated with said temporary actions, wherein said results of said analyzing and said confirmation data indicate that said user is no longer available for access to said social network account, wherein said enabling said permanent actions comprises:
  disabling said social network account of said user; and
  disabling updates associated with said social network account of said user to/from said group of users;
receiving, by said computer processor from said user, an email confirmation indicating that said user is available for access to said social network account, wherein said email confirmation is associated with a registered email address associated with said social network account;
transmitting, by said computer processor to said user, a request for video evidence indicating that said user is available for access to said social network account;
enabling, by said computer processor in response to a user action with respect to said request, a Web camera of a device belonging to said user;
retrieving, by said computer processor from said Web camera a current photo of said user;
retrieving, by said computer processor from said social network account additional photos of said user;
comparing, by said computer processor, said current photo to said additional photos of said user;
determining, by said computer processor in response to results of said comparing, a match between said current photo and a photo of said additional photos;
enabling said social network account of said user; and
enabling said updates associated with said social network account of said user with respect to said group of users.

* * * * *